United States Patent
Ben-Itzhak

(10) Patent No.: US 9,058,612 B2
(45) Date of Patent: Jun. 16, 2015

(54) SYSTEMS AND METHODS FOR RECOMMENDING SOFTWARE APPLICATIONS

(75) Inventor: Yuval Ben-Itzhak, Brno (CZ)

(73) Assignee: AVG Netherlands B.V., Amsterdam (NL)

( * ) Notice: Subject to any disclaimer, the term of this patent is extended or adjusted under 35 U.S.C. 154(b) by 629 days.

(21) Appl. No.: 13/117,858

(22) Filed: May 27, 2011

(65) Prior Publication Data

US 2012/0303477 A1    Nov. 29, 2012

(51) Int. Cl.
   *G06N 5/00*    (2006.01)
   *G06F 1/00*    (2006.01)
   *G06Q 30/02*    (2012.01)

(52) U.S. Cl.
   CPC ........................................ *G06Q 30/02* (2013.01)

(58) Field of Classification Search
   CPC ........... G06N 5/02; G06N 5/04; G06Q 30/02; G06Q 10/00
   USPC .......................................................... 706/45
   See application file for complete search history.

(56) References Cited

U.S. PATENT DOCUMENTS

| | | |
|---|---|---|
| 5,496,177 A | 3/1996 | Collia et al. |
| 5,734,720 A | 3/1998 | Salganicoff |
| 5,754,938 A | 5/1998 | Herz et al. |
| 5,754,939 A | 5/1998 | Herz et al. |
| 5,758,257 A | 5/1998 | Herz et al. |
| 5,835,087 A | 11/1998 | Herz et al. |
| 6,020,883 A | 2/2000 | Herz et al. |
| 6,029,195 A | 2/2000 | Herz |
| 6,029,258 A | 2/2000 | Ahmad |
| 6,088,722 A | 7/2000 | Herz et al. |
| 6,405,327 B1 | 6/2002 | Sipple et al. |
| 6,460,036 B1 | 10/2002 | Herz |
| 6,473,855 B1 | 10/2002 | Welder |
| 6,477,703 B1 | 11/2002 | Smith et al. |
| 6,571,279 B1 | 5/2003 | Herz et al. |
| 6,592,786 B2 | 7/2003 | Joseph |
| 6,701,362 B1 | 3/2004 | Subramonian et al. |
| 6,763,452 B1 | 7/2004 | Hohensee et al. |
| 6,901,536 B2 | 5/2005 | Davenport |
| 6,922,608 B2 | 7/2005 | Joseph |
| 7,013,456 B1 | 3/2006 | Van Dyke et al. |
| 7,035,863 B2 | 4/2006 | Kurapati et al. |

(Continued)

FOREIGN PATENT DOCUMENTS

| | | |
|---|---|---|
| WO | WO-0031671 | 6/2000 |
| WO | WO-02065327 | 8/2002 |
| WO | WO-2008153625 | 12/2008 |

OTHER PUBLICATIONS

Matthias Böhmer et al., "Exploring the Design Space of Context-aware Recommender Systems that Suggest Mobile Applications", RecSys 2010—Workshop on Context-Aware Recommender-Systems, Jan. 1, 2010, pp. 1-5.

(Continued)

*Primary Examiner* — Jeffrey A Gaffin
*Assistant Examiner* — Kalpana Bharadwaj
(74) *Attorney, Agent, or Firm* — Kramer Levin Naftalis & Frankel LLP

(57) ABSTRACT

A potentially beneficial software product is recommended to a user based, in part, on an analysis of parameters associated with the user's usage of software applications already installed on the user's computer.

30 Claims, 3 Drawing Sheets

(56) References Cited

U.S. PATENT DOCUMENTS

| | | |
|---|---|---|
| 7,069,256 B1 | 6/2006 | Campos |
| 7,117,113 B1 | 10/2006 | Baekelmans et al. |
| 7,158,986 B1 | 1/2007 | Oliver et al. |
| 7,185,336 B2 | 2/2007 | Vaughan |
| 7,328,216 B2 | 2/2008 | Hofmann et al. |
| 7,408,677 B2 | 8/2008 | Ito et al. |
| 7,483,871 B2 | 1/2009 | Herz |
| 7,493,368 B2 | 2/2009 | Raverdy et al. |
| 7,584,223 B1 | 9/2009 | Pinkas et al. |
| 7,603,331 B2 | 10/2009 | Tuzhilin et al. |
| 7,644,397 B2 | 1/2010 | Warren et al. |
| 7,657,907 B2 | 2/2010 | Fennan et al. |
| 7,694,294 B2 | 4/2010 | Bukovec et al. |
| 7,698,170 B1 | 4/2010 | Darr et al. |
| 7,765,166 B2 | 7/2010 | Beringer et al. |
| 7,823,207 B2 | 10/2010 | Evenhaim |
| 7,853,600 B2 | 12/2010 | Herz et al. |
| 2001/0014868 A1 | 8/2001 | Herz et al. |
| 2003/0005134 A1 | 1/2003 | Martin et al. |
| 2003/0237087 A1 | 12/2003 | Kurapati et al. |
| 2004/0098744 A1 | 5/2004 | Gutta |
| 2004/0249914 A1 | 12/2004 | Flocken et al. |
| 2005/0132336 A1 | 6/2005 | Gotwals et al. |
| 2006/0069749 A1 | 3/2006 | Herz et al. |
| 2006/0116981 A1 | 6/2006 | Krimmel et al. |
| 2006/0161952 A1 | 7/2006 | Herz et al. |
| 2007/0016544 A1 | 1/2007 | Graefe et al. |
| 2008/0077614 A1 | 3/2008 | Roy |
| 2008/0133681 A1 | 6/2008 | Jackson et al. |
| 2008/0270561 A1 | 10/2008 | Tang et al. |
| 2008/0270579 A1 | 10/2008 | Herz et al. |
| 2008/0276186 A1 | 11/2008 | Feduszczak et al. |
| 2008/0294584 A1 | 11/2008 | Herz |
| 2008/0294624 A1 | 11/2008 | Kanigsberg et al. |
| 2009/0089227 A1 | 4/2009 | Sturrock et al. |
| 2009/0105991 A1 | 4/2009 | Ramacher et al. |
| 2009/0138898 A1* | 5/2009 | Grechanik et al. ............ 719/328 |
| 2009/0210378 A1* | 8/2009 | Benson et al. .................. 706/52 |
| 2009/0234878 A1 | 9/2009 | Herz et al. |
| 2009/0240568 A1 | 9/2009 | Ramer et al. |
| 2009/0281819 A1 | 11/2009 | Garg |
| 2009/0300523 A1 | 12/2009 | Hwang et al. |
| 2010/0023933 A1 | 1/2010 | Bryant et al. |
| 2010/0058048 A1 | 3/2010 | Gotcher et al. |
| 2010/0058313 A1 | 3/2010 | Hansmann et al. |
| 2010/0250337 A1 | 9/2010 | Kassaei |
| 2010/0325126 A1 | 12/2010 | Rajaram et al. |
| 2011/0022477 A1 | 1/2011 | Hatridge et al. |
| 2011/0137776 A1* | 6/2011 | Goad et al. ...................... 705/34 |
| 2011/0218827 A1* | 9/2011 | Kenefick et al. .................. 705/4 |

OTHER PUBLICATIONS

Matthias Böhmer et al., "Contextualizing Mobile Applications for Context-aware Recommendation", The 8th International Conference on Pervasive Computing, May 20, 2010.

European Search Report, Application No. EP12807722, date of mailing Oct. 17, 2014.

* cited by examiner

SYSTEMS AND METHODS FOR RECOMMENDING SOFTWARE APPLICATIONS

FIELD OF THE INVENTION

The invention relates generally to the field of recommending software products to users, and, more specifically, to systems and methods for generating recommendations for software products that are potentially beneficial to the user's system based on software application usage data.

BACKGROUND

Consumer and professional computer systems typically include software products such as word-processing applications, picture and movie management software, and other business applications. Some of these software products are installed by the system manufacturer while other products may be purchased and installed by users of the computer system. In the software marketplace, new products are generally introduced on a regular basis, but many users are often unaware of the newly available products, particularly those offered by small vendors. A user may also not know about products that perform potentially beneficial functions that are not provided by the software applications currently installed on the user's computer.

One way in which a user may learn about newly available or previously existing software products is by searching for a product based on the functionality it performs. For example, a user may want to purchase photo-editing or backup software, in which case the user may enter such terms into a search engine, hoping for relevant results. The search results and/or context-based advertisements delivered to the user may provide information regarding potentially beneficial software products. Another situation in which a user becomes aware of software products is when the user purchases a product from a vendor. The vendor may recommend similar or beneficial products based on the purchase history of that user and/or other buyers, search terms used by that buyer and/or other consumers, and/or products that may complement the purchased product.

These approaches, however, face several limitations in identifying and recommending a potentially useful product to a user that the user is likely to buy. For example, when a user searches for a product, the search may be limited to the user's knowledge of the available functionality. In other words, if the user is not aware of any product that meets a desired functionality, the user may not search for that functionality, and hence, may not learn about a potentially useful product. The recommendations provided by vendors are usually based only on the information available to a particular vendor, which, from a user's perspective can be incomplete. For example, a user may routinely buy software products from different vendors, and hence, a certain vendor, unaware of the user's overall purchases, may recommend a product that the user already owns. Accordingly, vendor-supplied recommendations may not be helpful or even relevant to some users. Therefore, there is a need for improved methods and systems that enable recommending software products that are potentially beneficial to users of computer systems based on more relevant and accurate data that currently used.

SUMMARY OF THE INVENTION

In various embodiments of the present invention, recommendations for useful or potentially valuable software applications are provided to a user. This is achieved, in part, by collecting comprehensive data about the user's computing system and its use, e.g., data that includes not only static data such as processor speed, size of the installed memory, operating system, etc., but also usage data corresponding to how the user interacts with the computer system. Examples of usage data include application-data parameters (e.g., the types of software applications installed on the computer, the frequency at which the user invokes various applications, types and sizes of files associated with the installed applications, etc.) and system parameters (e.g., available memory, average run time of an application, etc.).

Various system parameters and/or application-data parameters are collected and analyzed statistically and/or based on certain rules. By analyzing these parameters, a functionality lacking on the computer system but potentially beneficial to the user, such as a backup application, a database and/or indexing application, a financial-analysis application, computer tune-up software, etc. is identified. In contrast to conventional methods, the identification of the beneficial functionality is not based solely on the user's search for a product, or the history of products he or she purchased from a vendor (although these may be considered). Instead, software applications are identified based on what is currently installed on the system, how the existing applications are used, and the performance of those applications. Thus, the analysis is performed from a user's perspective, and is based on a comprehensive knowledge of the user's usage of the available software applications. Therefore, a software application that can provide the identified functionality that may be beneficial, yet is currently lacking on the user's computer, can be more valuable to the user than those recommended by the existing systems.

The analysis can also include comparing a target user's usage patterns with other users' usage patterns. Other users that use similar software applications in a similar manner may use applications not currently installed on the target user's computer system. For example, many users who use tax-preparation software provided by a certain vendor may also use a personal-finance software supplied by a different vendor. The target user may use the tax-preparation software, but may not own the personal-finance software. Such potentially beneficial applications may be identified based on the analysis of usage patterns of the target and the other users, and may be recommended to the target user.

Accordingly, in one aspect, a computer-implemented method for recommending a category of software applications includes programmatically collecting parameters associated with usage of software applications installed on a computer. In particular, the parameters relate to the usage of the applications installed by the user. The method also includes mining the collected usage parameters to identify a potentially beneficial functionality not provided by applications presently installed on the computer (i.e., not entirely, effectively, or efficiently provided by any of the installed applications), and determining a category of software applications capable of performing the potentially beneficial functionality.

The collected usage parameters may include an execution parameter associated with the installed software applications, a system parameter, an application parameter, or combinations of one or more of the different types of parameters described above. The system parameters may include a processor type, size of available memory, disk-access time, network bandwidth constraints, installed hardware (internal and/or peripherals), and/or average data-reception time. The application parameters may include a type of an installed software application, a number of files of a type, a size of a file, and/or the frequency of use of an installed application.

In some embodiments mining includes applying a rule to compare the collected usage parameters with a nominal value corresponding to that parameter. The mining may also include statistically analyzing the collected usage parameters. The collected usage parameters may be stored in a database; in some embodiments the database is a local database, while in other embodiments the database is a remote database. The database can also include both local and remote databases and include data from many users and computer systems. The software-application category identified during mining may be back-up software, indexing software, database software, or system-maintenance software, as well as other types of applications.

The method may additionally include recommending a software application (or applications) belonging to the determined category. The recommended software application (i.e., product) may be cataloged in a software-application inventory database.

In another aspect, a computer-implemented method of recommending a software application includes programmatically collecting parameters associated with a user's activities related to software applications installed on the computer. These parameters are collected at a computer on which the applications are installed and in some cases operating. The method also includes statistically analyzing the collected usage parameters based on reference parameters. The analysis is performed to identify a potentially beneficial software application not present on the computer, and to determine a likelihood of the user using the identified software application. In addition, the method includes recommending to the user the identified software application, based on the determined likelihood of the user using the identified software application.

In some embodiments, the method includes installing and/or executing the identified software application on the computer. The method may also include storing the collected usage parameters in a database located on the computer and, in some cases, in a remote database, which may be in a central location or distributed among numerous locations. In some embodiments, the method includes generating the reference parameters. The reference parameters can be programmatically collected parameters associated with the usage of software applications installed on other computers. Alternatively or in addition, the reference parameters can be programmatically collected parameters associated with usage by other users of software applications installed on the same computer.

In some embodiments, analyzing includes clustering, which includes determining a co-occurrence between two installed software applications. The co-occurrence may be based on the collected usage parameters and/or the reference parameters. The collected usage parameters may include a type of installed software applications, a number of files of a particular type, a size of a file, an association between a file type and the installed software applications, frequency of use of the installed software applications, and an average time of use of the installed software applications.

In yet another aspect, a system for recommending a category of software applications includes a profiler module for programmatically collecting parameters associated with usage of software applications installed on a computer, and a miner module for mining the collected usage parameters to identify a potentially beneficial functionality not present on the computer. The miner also determines a category of software applications capable of performing the identified functionality.

The system may include a database module for storing the collected usage parameters, and the database module may be configured to store rules applied by the miner to identify the potentially beneficial functionality, and/or nominal values corresponding to one of the usage parameters.

In some embodiments, the profiler module, the miner module, and the database module are located at one computer, while in other embodiments the profiler module is located at a first computer, and the miner module and the database module are located at a different, second computer. The system may also include an inventory module including an inventory database for recommending a software application belonging to the determined category. The software application may be cataloged in the inventory database.

In yet another aspect, a system for recommending a software application includes a profiler module for programmatically collecting parameters associated with usage of software applications installed on a computer. The system also includes a database module for storing the collected usage parameters, and an analyzer module for statistically analyzing the collected usage parameters based on reference parameters. The analyzer identifies a potentially beneficial software application, determines a likelihood that the user will use the identified software application, and recommends to the user the identified software application, based on the likelihood of the user using the identified software application. The system may include an installer for installing the identified software application on the computer. The system may also include a reference database module for storing the reference parameters.

Other aspects and advantages of the invention will become apparent from the following drawings, detailed description, and claims, all of which illustrate the principles of the invention, by way of example only.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
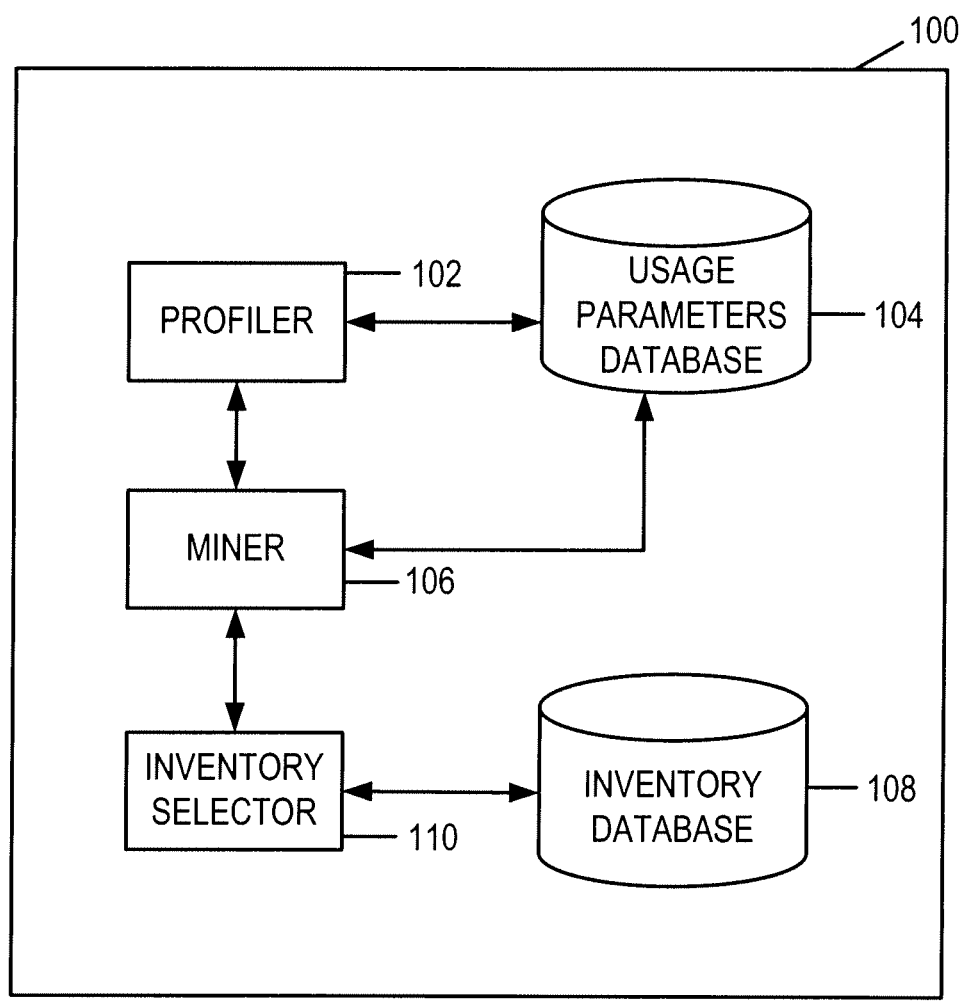
FIG. 1 schematically shows a rule-based recommendation system in accordance with various embodiments of the invention.

Referring to FIG. 1, an exemplary system 100 for recommending a software application to a user includes a profiler module 102. The profiler module 102 typically collects system (i.e., hardware) parameters associated with the user's computer system such as the type and speed of the processor, disk-access time, size and/or speed of the memory installed, etc. The profiler module 102 also identifies one or more installed operating systems, and the software applications installed on the computer system. The installed software applications may include communication applications such as email, internet phone, and web-browser applications, household applications, and business software. In one instance for example, the profiler module 102 may detect that an email software, a document-preparation software suite, a photo and movie-editing software, and accounting software are installed on the user's computer.

In addition, the profiler module 102 collects various application-execution parameters (e.g., speed of loading, execution, etc.), and application parameters, i.e., parameters associated with the use of the installed applications by a certain user. The application parameters may include, for example, the frequency at which a particular user invokes a certain application, the functions used within the application (e.g., revisioning, charting, etc.). For example, one user of the computer system described above may use the email application and the web browser daily, but may not use the accounting software. Another user, on the other hand, may use the accounting software on a weekly basis and may frequently use the web browser, but may not use the email application.

The application usage parameters corresponding to a user may also include the average duration of use of an application during a day, the distribution of file types stored on the computer (e.g., numbers and percentages of different types of files), sizes of the files, and their association with the installed applications. In some embodiments, the usage parameters include processes that typically run when a particular user logs on, and the resources (memory consumed, processor time, etc.) used by each of those processes, attributes of the installed applications (e.g., the product's version, latest software patch installed, the digital signature of the vendor making the software, etc.), the errors logs generated by the operating system, and the network communication attributes and data (e.g., average speed of data reception and/or transmission, average size of data exchanged, etc.).

The profiler module 102 may collect the usage parameters including the system and application parameters periodically (e.g., every day, once a week, etc.), when requested by a user, or when a new software application is installed, etc. The user may also specify the frequency at which these parameters are collected. The collected parameters are stored in a local database module 104 at the user's computer.

The miner module 106 analyzes the usage parameters stored in the database 104. In some embodiments, the miner module 106 may receive the usage parameters directly from the profiler module 102, i.e., the parameters may be analyzed (also called mined) prior to storage, or may not be stored at all. During the analysis, the miner module 106 applies rules to the collected parameters. A rule typically relates to the usage parameters, and requires comparing an observed usage parameter (e.g., a parameter collected by the profiler 102) with a nominal value corresponding to that parameter. The rules and/or the nominal parameter values applied by the rules may be embedded in the miner module 106, and/or may be stored in the database 104 and/or another database.

The miner module 106 determines, based on the comparisons described above, which rules were applied successfully and, accordingly, identifies a functionality that may be lacking on the user's computer. The miner 106 then determines a category of software applications that can perform the lacking functionality. As used herein, "category" generally means a class or type of software products that are capable of performing the lacking functionality.

The recommendation system 100 also includes a software application inventory database 108 and an inventory module 110 that receives the recommended category from the miner module 106. From the scenarios described below, PC tune-up software, backup software, and indexing software are some examples of software-application categories. In each category, there may be numerous commercially available products capable of performing a functionality corresponding to that category. These products may be provided by the same vendor (e.g., as a regular version or as a premium version), or by different vendors. The inventory module 110 searches for a software product belonging to the category identified by the miner module 106 in the inventory database 108. If more than one products are found in the inventory database 108, they all may be recommended to the user. The recommendations may include reviews from other users, technical specifications, price, etc.

Alternatively, the inventory module 110 may recommend a product based various characteristics of the products. Typical characteristics analyzed by the inventory module 110 include price of the product, ratings provided by other users, and whether the user has already purchased a product provided from the vendor that also has a product in the desired category. For example, if the user uses tax-preparation software from one vendor, he may prefer personal-finance software from the same vendor because the two products may be able to readily exchange data with each other.

The following scenarios illustrate the operations of the profiler module 102, the miner module 106, and the inventory module 110. In one instance, the profiler module 102 collects information about the available memory on the computer, the access time to files on the disk, and the average time taken by a browser to load. The collected parameters indicate that the computer has less than 255 Mbytes of available memory, the access time to files on the disk is greater than 10 msec., and the average time taken by the browser to load is greater than 3 seconds.

The miner module 106 analyzes these results by applying various rules. In particular, the miner module 106 identifies that the available memory is less than 512 Mbytes, the disk-access time is greater than 1 msec., and that data-access time is greater than 0.2 seconds. Having determined that the usage parameters differ substantially from the corresponding nominal values (described above) the miner module 106 may recommend a PC tune-up application along with a message that the user's computer can operate significantly faster by tuning the resources of the computer. The inventory module 110 also receives the recommendation from the miner module 106 and searches its inventory for a PC tune-up application. The inventory module 110 then recommends a PC tune-up application available in its inventory.

In a second scenario, the information collected by the profiler module 102 includes the types of the installed applications and the distribution of file types stored on the computer. One of the parameters collected by the profiler module 102 is the number of files of a particular type, indicating, for example, that the computer has more than 5,000 image files stored in the "My Pictures" folder. Based on the collected parameters, the miner module 106 identifies that one of the installed applications relates to digital camera management. The miner 106 also determines that a backup application is not installed on the computer. Based on a set of rules included in the miner module 106, it recommends a backup application, along with a message that family pictures might be lost if not backed up. Moreover, the inventory module 110 identifies and recommends a backup application available in its inventory.

In a third scenario, the parameters collected by the profiler 102 include the types of installed software applications and the distribution of file types stored on the computer. The collected parameters indicate that Microsoft Outlook is installed on the computer, and that the size of the Outlook database is about 20 Gbytes. Using these parameters the miner module 106 determines that one of the installed applications is email software, and that the size of the database used by the email software is greater than 100 Mbytes. Based on the rules provided to the miner module 106, it determines that the speed of email search can be increased using indexing. Accordingly, it recommends an email search and indexing application, with a message that productivity may increase if emails in the Inbox are easily searchable.

Figure 2:
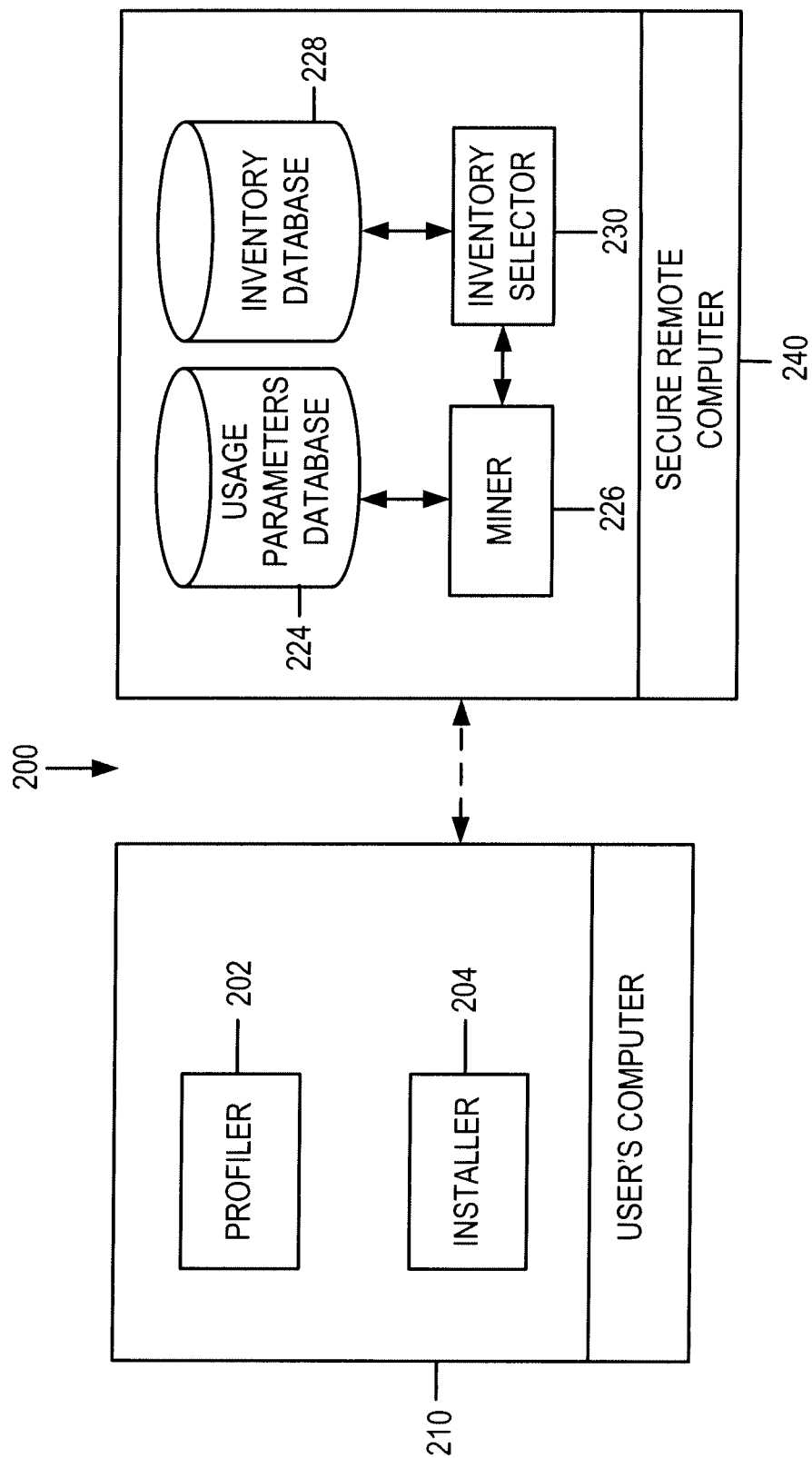
FIG. 2 schematically shows another recommendation system in which different components of the system are located at different computers in accordance with various embodiments of the invention.

The recommendation system 200 illustrated with reference to FIG. 2 is similar to the system 100 shown in FIG. 1. In the system 200, the profiler module 202 is located at the computer 210 from which the usage parameters are collected. The database module 224, the miner module 226, the inventory database 228, and the inventory module 230, however, are located at a remote computer 240. In the system 200, the profiler module 202 transmits the collected usage parameters to the remote computer 240. The remote computer 240 and the communication between the computers 210, 240 can be secured.

The miner module 226 analyzes the usage parameters to identify a software category, and the inventory module 230 selects a software product belonging to that category, as described above with reference to FIG. 1. Alternatively, or in addition the miner module 230 may statistically analyze the usage parameters to identify a functionality lacking on the computer 210, and may determine a category of software applications that can provide that functionality. For example, based on a trend in the average number of hard-disk errors disk-repair software may be recommended, or after detecting a high rate of data exchange a video acceleration or network bandwidth throttling software may be recommended to speed up the delivery and rendering of multimedia content. The selected product is communicated to the computer 210, and recommended to the user as a message. If the user chooses to test or purchase the recommended product, the installer 204 installs and executes the recommended product. It should be understood, however, that the installer 204 is optional, and that systems that merely recommend a product are within the scope of the invention.

In some embodiments, an inventory database and an inventory module may not be provided. In these implementations, the miner module displays a message to the user recommending the category of the potentially beneficial software. In some embodiments, the miner module, the database, the inventory module, and the inventory database are located individually, or in groups at different computers.

Figure 3:
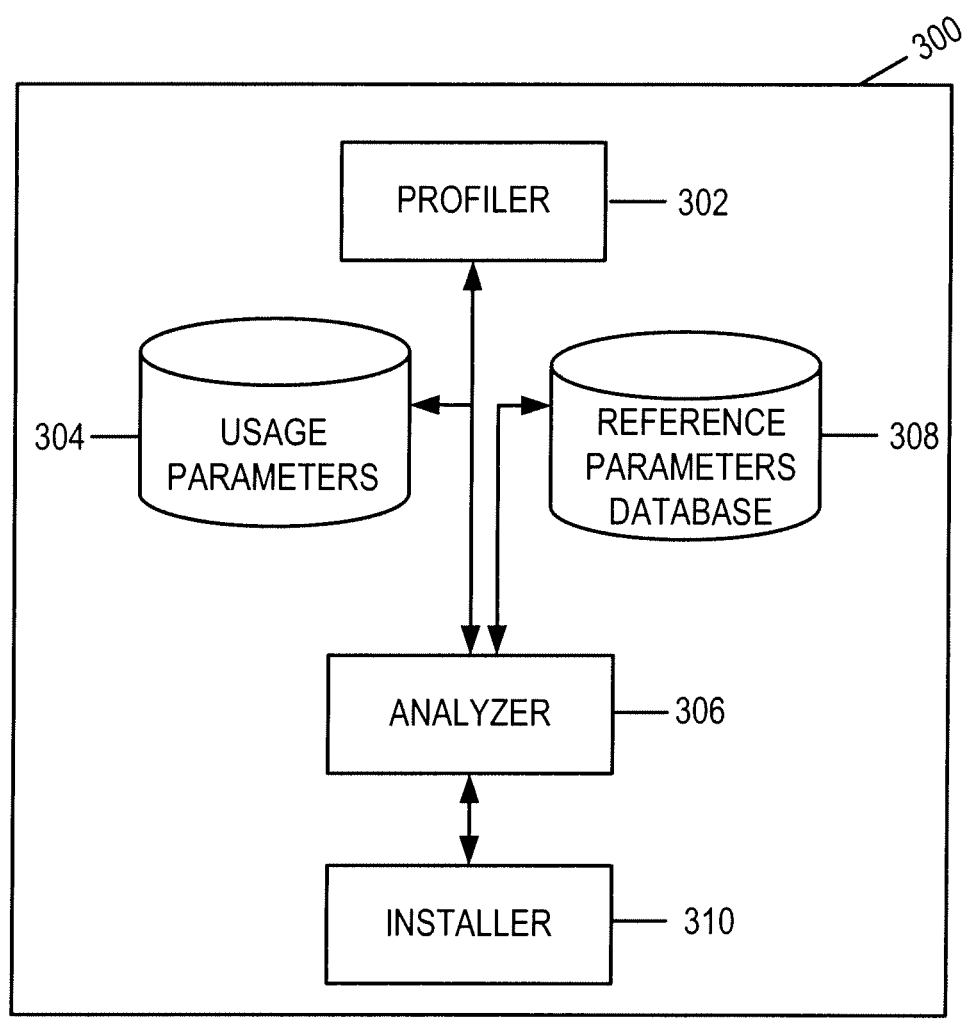
FIG. 3 schematically shows a system that recommends software products based on a computed likelihood that a user will install the recommended software in accordance with various embodiments of the invention.

With reference to FIG. 3 and system 300, the profiler module 302 collects the parameters related to the usage of various software applications by a target user, similarly as described above with reference to FIG. 1. The collected usage parameters are stored in the database 304. The analyzer module 306 receives reference parameters that are stored in a reference database 308 and the usage parameters from the database 304, and recommends a software product to the target user. The reference database 308 is optional, and in some embodiments the reference parameters are also stored in the database 304, while in other embodiments the reference parameters are not stored. In general, the reference parameters are also usage parameters, similar to those collected by the profiler module 302, but collected from a different computer system. Alternatively or in addition, the reference parameters may be collected from the same computer on which the profiler 302 operates, but are related to the usage of software applications by one or more other users of that computer. The parameters collected from different computers and/or users may be aggregated.

A data clustering engine included in the analyzer module 306 forms clusters of software applications corresponding to both the reference and collected usage parameters. As such, the data clustering engine may perform affinity analysis to identify "clusters" representing co-occurrence relationships among the software applications. For example, users who extensively use a spreadsheet software product for significant data analysis may also use a statistical-analysis software. With respect to those users, the spreadsheet and statistical-analysis software products may belong to one cluster, while for other occasional users of the same spreadsheet software, that software and some other software (e.g., presentation software, inventory-management software, etc.) may belong to one cluster.

If a cluster based on the target user's usage parameter is similar to that based on the reference parameters, but lacks a particular product, the analyze module 306 may determine that because other users having similar usage patterns to the target user have the product lacking in the target user's cluster, the target user would likely benefit from that software product. Furthermore, based on the co-occurrence analysis, the analyzer 306 can also identify "anchor" software products, i.e., products with which a number of other supporting products are generally installed. An email application (e.g., Outlook) is an example of an anchor software, and mail indexing and search products, that are typically included with email applications, are the corresponding supporting products. Financial applications typically require security software to be installed as supporting software to protect financial data. Database applications can also be anchor applications requiring the use of backup software. If a cluster based on the target user's usage parameters lacks one of the supporting products, it is likely that the user may benefit from that product.

After clustering, the analyzer 306 determines a likelihood that the target user will buy the product not currently present in the user's cluster based on parameters such as frequency of use, duration of use, the number of products in a cluster, etc. If the likelihood is determined to be high (e.g., greater than 35%, 60%, 75%, etc.) the analyzer 306 recommends the product that is not currently present in the target user's cluster. If the user chooses to test or purchase the recommended product, the installer 310 installs and executes the recommended product. It should be understood, however, that the installer 310 is optional, and that systems that merely recommend a product are within the scope of the invention.

Advantageously, the recommendation based on clustering is derived from the target user's perspective in that it is based on the knowledge of the software products already installed on the target user's computer, and his usage of those products. Therefore, it is highly likely that the user will find the recommendation valuable, and will therefore test and/or purchase the recommended product. Moreover, unlike the vendor-based systems that collect and store the user's data (e.g., purchase history, search terms used, etc.) the system 300 retains the target user's usage data on that user's computer unless the user consents to sharing it, thereby protecting the user's privacy.

Each functional component described above (e.g., the profiler module, the miner module, the databases, the inventory module, the analyzer module, and the installer) may be implemented as stand-alone software components or as a single functional module. In some embodiments the components may set aside portions of a computer's random access memory to provide control logic that affects the interception, scanning and presentation steps described above. In such an embodiment, the program or programs may be written in any one of a number of high-level languages, such as FORTRAN, PASCAL, C, C++, C#, Java, Tcl, PERL, or BASIC. Further, the program can be written in a script, macro, or functionality embedded in commercially available software, such as EXCEL or VISUAL BASIC.

Additionally, the software may be implemented in an assembly language directed to a microprocessor resident on a computer. For example, the software can be implemented in Intel 80×86 assembly language if it is configured to run on an IBM PC or PC clone. The software may be embedded on an article of manufacture including, but not limited to, computer-readable program means such as a floppy disk, a hard disk, an optical disk, a magnetic tape, a PROM, an EPROM, or CD-ROM.

The invention can be embodied in other specific forms without departing from the spirit or essential characteristics thereof. The foregoing embodiments are therefore to be considered in all respects illustrative rather than limiting on the invention described herein.

What is claimed is:

1. A computer-implemented method for recommending a category of software applications, the method comprising:
   programmatically collecting, using a computer processor of a computer, parameters associated with usage of at least one software application installed on the computer, the usage parameters comprising information regarding the types of software applications installed on the computer and a distribution of file types stored on the computer;
   mining, using the computer processor, the collected usage parameters;
   identifying a functionality not present on the computer based on the information; and
   determining, using the computer processor, a category of software applications capable of performing the functionality.

2. The method of claim 1, wherein at least one of the collected usage parameters comprises an execution parameter associated with the at least one installed software application.

3. The method of claim 1, wherein at least one of the collected usage parameters comprises at least one of a system parameter and an application parameter.

4. The method of claim 1, wherein the collected usage parameters comprise a system parameter, the system parameter comprising at least one of a processor type, size of available memory, disk-access time, and average data-reception time.

5. The method of claim 1, wherein the collected usage parameters comprise an application parameter, the application parameter comprising at least one of a size of a file and a frequency of use of an installed application.

6. The method of claim 1, wherein mining comprises applying a rule to compare one of the collected usage parameters with a nominal value corresponding to that parameter.

7. The method of claim 1, wherein mining comprises statistically analyzing the collected usage parameters.

8. The method of claim 1, further comprising storing the collected usage parameters in a database.

9. The method of claim 8, wherein the database comprises one of a local database, a remote database, and a centralized database.

10. The method of claim 1, wherein the software-application category is one of back-up software, indexing software, database software, and system-maintenance software.

11. The method of claim 1, further comprising recommending at least one software application belonging to the determined category, the recommended at least one software application being cataloged in a software-application inventory database.

12. A computer-implemented method of recommending a software application, the method comprising:
   programmatically collecting, with a computer processor of a computer, parameters associated with usage by a user of at least one software application installed on the computer;
   statistically analyzing, using the computer processor, the collected usage parameters based on reference parameters by:
      determining, based on the reference parameters, that usage of a first software application by at least one other user is associated with usage of a second software application by the at least one other user; and
      identifying that one of the first and second software applications is not present on the computer based on the collected usage parameters; and
   recommending to the user the one of the first and second software applications not present on the computer.

13. The method of claim 12, further comprising at least one of installing and executing the identified software application on the computer.

14. The method of claim 12, further comprising storing the collected usage parameters in a database located at the computer.

15. The method of claim 12, further comprising generating the reference parameters by programmatically collecting parameters associated with usage of at least one software application installed on at least one other computer.

16. The method of claim 12, further comprising generating the reference parameters by programmatically collecting, using the computer processor, parameters associated with usage by at least one other user of at least one software application installed on the same computer.

17. The method of claim 12, wherein analyzing further comprises determining, using the computer processor, a likelihood of the user using the one of the first and second software applications not present on the computer, and wherein recommending to the user the one of the first and second software applications not present on the computer is based on the determined likelihood.

18. The method of claim 12, wherein at least one of the collected usage parameters comprises at least one of a type of the at least one installed software application, a number of files of a type, size of a file, an association between a file type and the at least one installed software application, frequency of use of each of the at least one installed software application, and average time of a single use of each of the at least one installed software application.

19. A system for recommending a category of software applications, the system comprising:
   a profiler module configured to programmatically collect parameters associated with usage of at least one software application installed on a computer, the usage parameters comprising information regarding the types of software applications installed on the computer and a distribution of file types stored on the computer; and
   a miner module configured to (i) mine the collected usage parameters for the information to identify a functionality not present on the computer, and (ii) determine a category of software applications capable of performing the identified functionality.

20. The system of claim 19, further comprising a database module configured to store the collected usage parameters.

21. The system of claim 20, wherein the database module is further configured to store at least one of (i) a rule applied by the miner module to identify the functionality, and (ii) a nominal value corresponding to one of the usage parameters.

22. The system of claim 20, wherein the profiler module, the miner module, and the database module are located at one computer.

23. The system of claim 20, wherein the profiler module is located at a first computer, and the miner module and the database module are located at a second computer.

24. The system of claim 19, further comprising an inventory module comprising an inventory database configured to recommend at least one software application belonging to the determined category, the recommended at least one software application being cataloged in the inventory database.

25. A system for recommending a software application, the system comprising:
 a profiler module configured to programmatically collect parameters associated with usage by a user of at least one software application installed on a computer;
 a database module configured to store the collected usage parameters; and
 an analyzer module configured to statistically analyze the collected usage parameters based on reference parameters by (i) determining, based on the reference parameters, that usage of a first software application by at least one other user is associated with usage of a second software application by the at least one other user, (ii) identifying that one of the first and second software applications is not present on the computer based on the collected usage parameters, and (iii) recommending to the user the one of the first and second software applications not present on the computer.

26. The system of claim 25, further comprising an installer for installing the identified software application on the computer.

27. The system of claim 25, further comprising a reference database module configured to store the reference parameters.

28. The method of claim 1, wherein the distribution of file types comprises the number of files of each file type stored on the computer.

29. The system of claim 19, wherein the distribution of file types comprises the number of files of each file type stored on the computer.

30. The system of claim 25, wherein the analyzer module is further configured to determine a likelihood of the user using the one of the first and second software applications not present on the computer, and wherein the analyzer module is configured to recommend to the user the one of the first and second software applications not present on the computer based on the determined likelihood.

* * * * *